(12) United States Patent
Frolund et al.

(10) Patent No.: US 7,284,088 B2
(45) Date of Patent: Oct. 16, 2007

(54) METHODS OF READING AND WRITING DATA

(75) Inventors: Svend Frolund, Mountain View, CA (US); Arif Merchant, Los Altos, CA (US); Yasushi Saito, Mountain View, CA (US); Susan Spence, San Jose, CA (US); Alistar Veitch, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 10/693,573

(22) Filed: Oct. 23, 2003

(65) Prior Publication Data

US 2005/0091450 A1 Apr. 28, 2005

(51) Int. Cl.
G06F 12/16 (2006.01)
G06F 12/00 (2006.01)

(52) U.S. Cl. ............................ 711/114; 714/3; 714/6; 714/7; 714/8

(58) Field of Classification Search ............... None
See application file for complete search history.

(56) References Cited

U.S. PATENT DOCUMENTS

| 5,506,977 A | 4/1996 | Jones et al. | |
| 5,740,465 A * | 4/1998 | Matsunami et al. | 710/5 |
| 2005/0091451 A1 | 4/2005 | Frolund et al. | |
| 2005/0091556 A1 | 4/2005 | Frolund et al. | |

OTHER PUBLICATIONS

U.S. Appl. No. 10/440,531, Veitch et al.
U.S. Appl. No. 10/440,548, Frolund et al.
U.S. Appl. No. 10/440,570, Merchant et al.

K. Amiri and G. A. Gibson and R. A. Golding, Highly concurrent shared storage, The 20th International Conference on Distributed Computing Systems (ICDCS 2000), Apr. 10-13, 2000, Taipei, Taiwan, pp. 298-307, IEEE Computer Society, Los Alamitos, CA, 2000.

H. Attiya, A. Bar-Noy, and D. Dolev, Sharing memory robustly in message-passing systems, Journal of the ACM, vol. 42, Issue 1, Jan. 1995, pp. 124-142, ACM Press, New York, NY, 1995.

P. Dutta, S. Frolund, R. Guerraoui, and B. Pochon, An efficient universal construction for message-passing systems, EPFL Technical Report IC-TR-2000228, May 2002.

S. Frolund, A. Merchant, Y. Saito, S. Spence, and A. Veitch, FAB: Enterprise storage systems on a shoestring, Proceedings of HOTOS IX: The Ninth Workshop on Hot topics in Operating Systems, Lihue, Hawaii, May 18-21, 2003, pp. 169-174, The USENIX Association, Berkeley, CA, 2003.

(Continued)

*Primary Examiner*—Hong Kim
*Assistant Examiner*—Midys Rojas

(57) ABSTRACT

A method of reading data comprises sending read messages to storage devices holding the stripe and receiving at least a quorum of reply messages. The reply message from the storage device holding the data block includes the data block. The quorum meets a quorum condition of a number such that any two selections of the number of stripe blocks intersect in the minimum number of the stripe blocks needed to decode the stripe. A method of writing data comprises sending query messages to storage devices holding the stripe, receiving a query reply message from each of at least a first quorum of the storage devices, sending modify messages to the storage devices, and receiving a write reply message from each of at least a second quorum of the storage devices. The first and second quorums each meet the quorum condition.

33 Claims, 12 Drawing Sheets

OTHER PUBLICATIONS

G. R. Goodson, J. J. Wylie, G. R. Ganger, and M. K. Reiter, Decentralized storage consistency via versioning servers, Technical Report CMU-CS-02-180, School of Computer Science, Carnegie Mellon University, Pittsburgh, PA. Sep. 2002.

J. Kubiatowicz, D. Bindel, Y. Chen, S. Czerwinski, P. Eaton, D. Geels, R. Gummadi, S. Rhea, H. Weatherspoon, W. Weimer, C. Wells, and B. Zhao, Oceanstore: An architecture for global-scale persistent storage, Proceedings of the Ninth International Conference on Architectural Support for Programming Languages and Operating Systems (ASPLOS-IX), Cambridge, MA, pp. 190-201, ACM Press, New York, NY, Nov. 2000.

L. Lamport, On Interprocess communication, Dec. 25, 1985.

E. K. Lee and C. A. Thekkath, Petal: Distributed virtual disks, Proceedings of the Seventh International Conference on Architectural Support for Programming Languages and Operating Systems (ASPLOS-VII), Cambridge, MA, pp. 84-92, ACM Press, New York, NY, 1996.

N. A. Lynch and A. A. Shvartsman, Robust emulation of shared memory using dynamic quorum acknowledged broadcasts, Dec. 2, 1996.

N. A. Lynch and A. A. Shvartsman, Rambo: A reconfigurable atomic memory service for dynamic networks, Distributed Computing: 16th International Conference, DISC 2002, Toulouse, France, Oct. 28-30, 2002, Proceedings, pp. 173-190, Springer-Verlag Heidelberg, Heidelberg, Germany, 2002.

D. Malkhi and M. Reiter. Byzantine quorum systems, Oct. 16, 1998.

J. S. Plank, A tutorial on Reed-Solomin coding for fault-tolerance in RAID-like systems, Software: Practice and Experience, Sep. 1997, vol. 27, Issue 9, pp. 995-1012, John Wiley & Sons, Limited, Hoboken, NJ, 1997.

H. Weatherspoon and J. Kubiatowicz, Erasure coding vs. replication: A quantitative comparison, Proceedings for the 1st International Workshop on Peer-to-Peer Systems (IPTPS '02), Mar. 2002.

Zhang, Z, Lian Q: "Reperasure: Replication Protocol using Erasure-oored in Peer-to-Peer Storage Network" Proceedings 21st IEEE Symposium on Reliable Distributed Systems, Oct. 13, 2002.

* cited by examiner

METHODS OF READING AND WRITING DATA

RELATED APPLICATIONS

This application is related to U.S. application Ser. Nos. 10/693,758 and 10/693,743, filed on Oct. 23, 2003, the contents of which are hereby incorporated by reference.

FIELD OF THE INVENTION

The present invention relates to the field of data storage. More particularly, the present invention relates to the field of data storage where a fault tolerant algorithm improves data accessibility.

BACKGROUND OF THE INVENTION

A critical component of computer systems is data storage. The data storage can be divided conceptually into an individual user's data storage, which is attached to the individual's computer, and network based data storage typically intended for multiple users.

One type of network based storage device is a disk array. The disk array includes a controller coupled to an array of disks. Typically, each of the disks of the disk array is hot swappable, which allows a disk to be replaced without turning off the disk array.

Often the network based storage must meet various performance requirements such as data access speed and data reliability. One way of providing high data access speed is to store data in stripes across multiple disks of the disk array. Each stripe includes multiple data blocks, each of which is stored on a separate disk. When the data is stored or read, each of the disks that holds a data block stores or retrieves the data block associated with it. In this way, the stripe of data is stored or retrieved in about the time it takes to store or retrieve one data block.

One way of providing high reliability is data replication. For the disk array, the data replication stores one or more additional copies of data on one or more separate disks. If one of the disks holding a copy of the data fails, the data is still accessible on at least one other disk. Further, because of the hot swappable feature of the disk array, a failed disk can be replaced without turning off the disk array. Once the failed disk has been replaced, the lost copy of the data can be restored.

Another way of providing the high reliability is erasure coding. Typically for the disk array, the erasure coding encodes one or more parity blocks for at least two data blocks stored on the device. Each of the data blocks and the one or more parity blocks is stored upon a separate disk of the disk array. If one of the data blocks is lost, it can be retrieved by decoding the lost data block from a parity block and the remaining data blocks.

As an alternative to the disk array, researchers have been exploring data storage on an array of independent storage devices. Each of the independent storage devices includes a CPU and one or more disks. A potential advantage of the array of independent storage devices includes an ability to locate each of the independent storage devices in separate physical locations. Another potential advantage of the array of independent storage devices is lower cost. The lower cost can result from mass production of the independent storage devices as commodity devices and from elimination of the hot swappable feature of the disk array.

What is needed is a method of reading a block of erasure coded data stored on independent storage devices.

What is needed is a method of writing a block of erasure coded data to independent storage devices.

SUMMARY OF THE INVENTION

An embodiment of a method of reading data of the present invention begins with a first step of receiving a request for a data block stored within a stripe of erasure coded data. The stripe of erasure coded data is stored across a plurality of storage devices. A second step comprises sending read messages to the storage devices. The method concludes with a third step of receiving at least a quorum of reply messages from the storage devices. The reply message from the storage device upon which the data block is stored includes the data block. The quorum meets a quorum condition of a number such that any two selections of the number of stripe blocks intersect in the minimum number of the stripe blocks needed to decode the stripe.

An embodiment of a method of writing data of the present invention begins with a first step of receiving a data block for storage within a stripe of erasure coded data. The stripe of erasure coded data comprises stripe blocks. A second step comprises sending a query message to each of a plurality of storage devices upon which the stripe of erasure coded data is stored. A third step comprises receiving a query reply message from each of at least a first quorum of the storage devices. The method concludes with a fifth step of receiving a write reply message from each of at least a second quorum of the storage devices. The first and second quorums each meeting a quorum condition of a number such that any two selections of the number of the stripe blocks intersect in a minimum number of the stripe blocks needed to decode the stripe.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention comprises methods of reading, writing, and recovering erasure coded data, which is stored onto and read from storage devices within a distributed storage system. The methods of the present invention include storing a stripe of erasure coded data, reading the stripe of erasure coded data, recovering the stripe of erasure coded data, storing a first block of erasure coded data, and reading a second block of erasure coded data.

Figure 1:
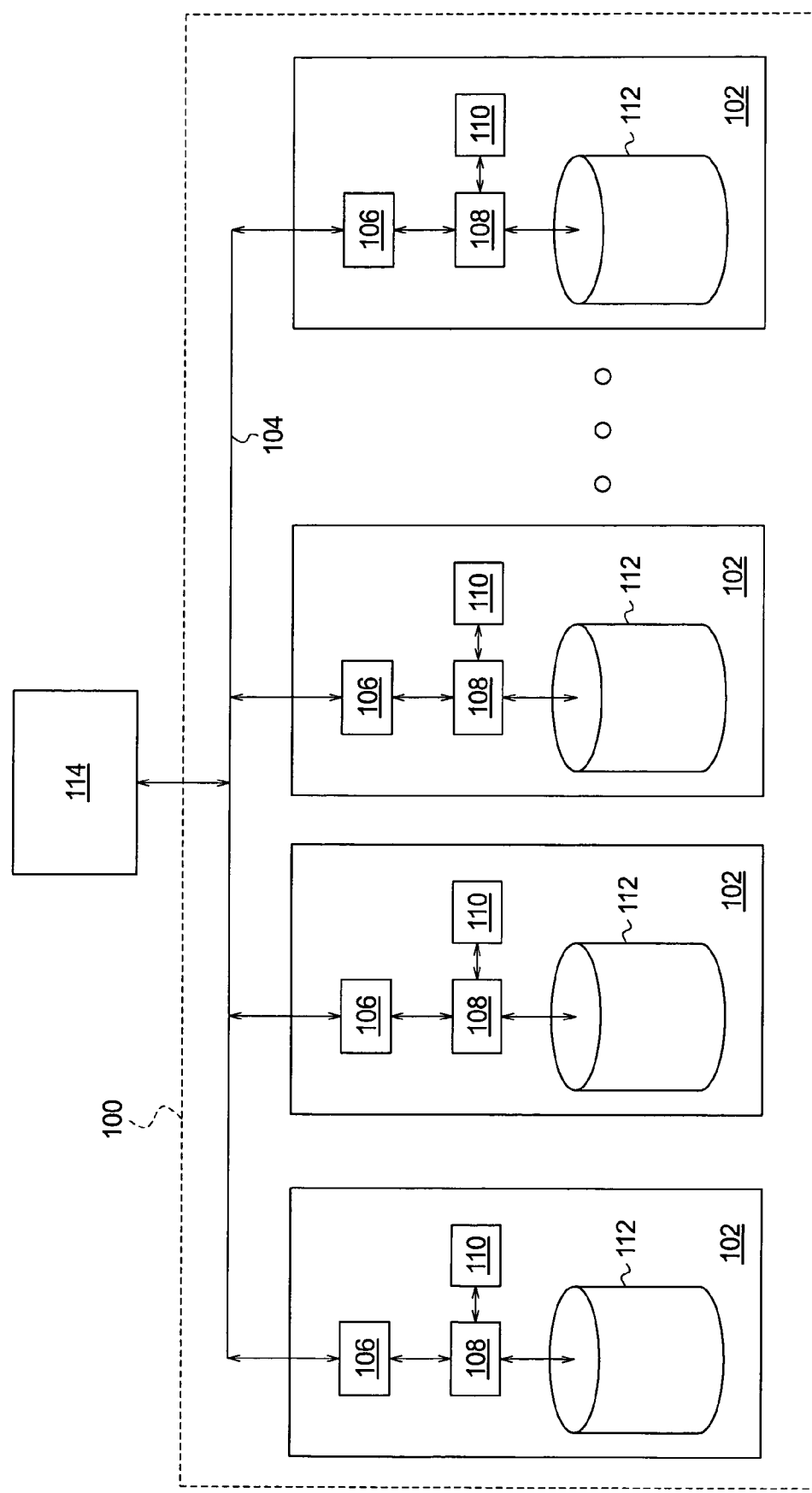
FIG. 1 schematically illustrates a distributed storage system and a client according to an embodiment of the present invention.

An embodiment of a distributed storage system of the present invention is illustrated schematically in FIG. 1. The distributed storage system 100 comprises a plurality of storage devices 102 which are coupled by a network 104. Preferably, each of the storage devices 102 comprises a network interface 106, a CPU 108, a NVRAM (non-volatile RAM) 110, and a storage media 112, which are coupled to each other. Alternatively, one or more of the storage devices 102 does not include the NVRAM 110. Preferably, the storage media 112 within the storage devices 102 comprises one or more disks. Alternatively, the storage media 112 within one or more of the storage devices 102 comprises some other storage media such as a tape.

In a typical invocation of one of the methods of the present invention, a client 114, which is coupled to the network 104, contacts one of the storage devices 102. The storage device 102 then acts as a coordinator of the method. Alternatively, the client 114 or another computer coupled to the network 104 acts as the coordinator.

Figure 2:
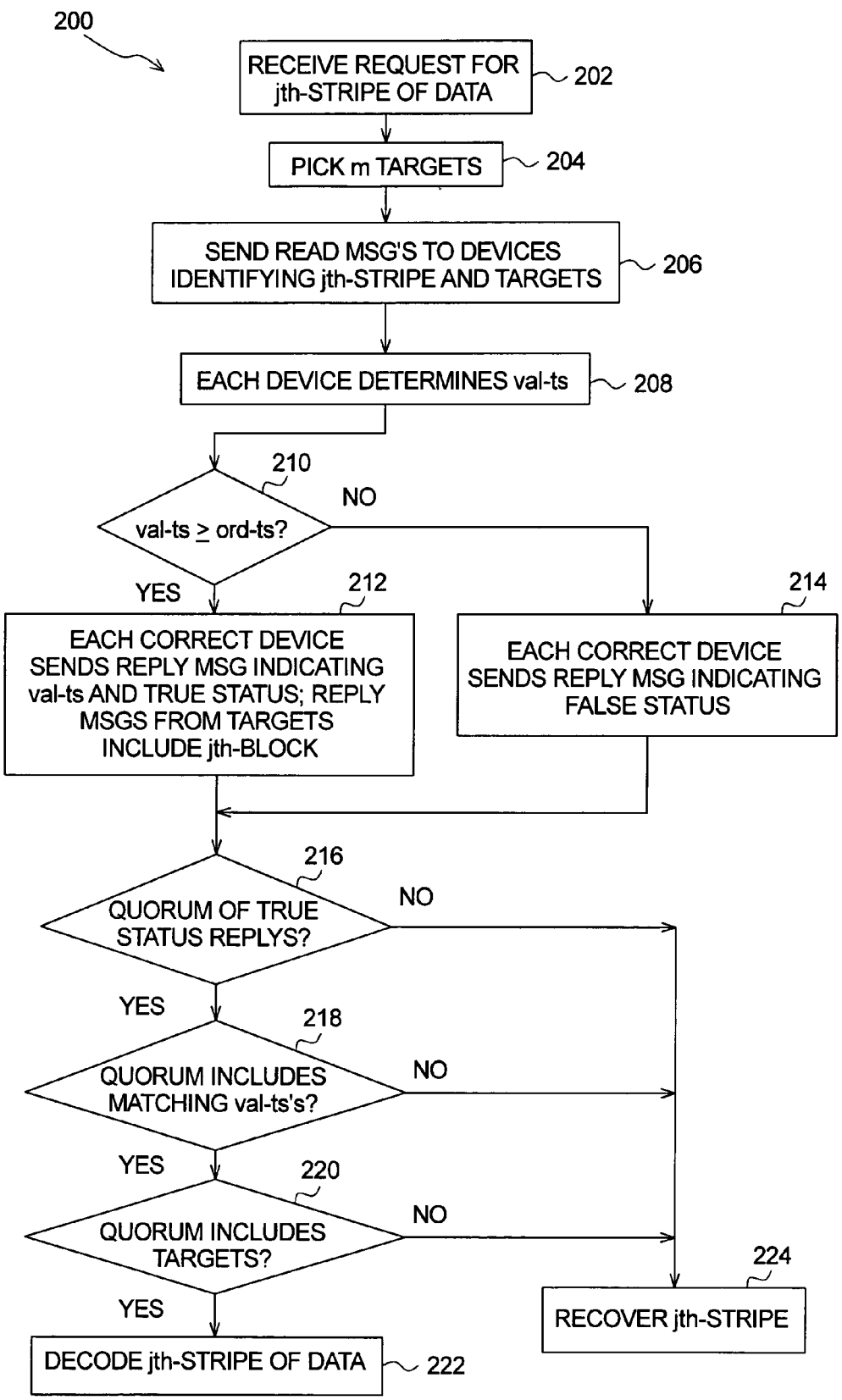
FIG. 2 illustrates a method of reading a stripe of erasure coded data as a flow chart according to an embodiment of the present invention.

An embodiment of the method of reading the stripe of erasure coded data of the present invention is illustrated as a flow chart in FIG. 2. The method of reading the stripe of erasure coded data 200 begins with the coordinator receiving the request for a jth-stripe of data in a first read stripe step 202. The jth-stripe of data comprises m data blocks. The jth-stripe of data is stored across n of the storage devices as a jth-stripe of erasure coded data. The jth-stripe of erasure coded data comprises n stripe blocks. Preferably, the n stripe blocks comprise the m data blocks plus p parity blocks (n=m+p). Preferably, the p parity blocks comprise 2f parity blocks, where f is a number of the n stripe blocks that are tolerated as faulty (n=m+p=m+2f). Alternatively, the jth-stripe of erasure coded data is encoded using another erasure coding scheme.

According to the present invention, a quorum is defined as a number of the n stripe blocks that meets a quorum condition. The quorum condition is that any selection of two sets of the n stripe blocks intersect in m of the n stripe blocks. If the n stripe blocks are encoded as the m data blocks plus the p parity blocks and p is an even number, the quorum is m+p/2. In this situation, the quorum is also m+f. If the n stripe blocks are encoded as the m data blocks plus the p parity blocks and p is an odd number, the quorum is m+p/2+½.

According to an embodiment of the present invention, the distributed storage system is made up of the n storage devices, which means that there is not a need for the coordinator to identify the n storage devices before proceeding with the method. According to another embodiment of the present invention, the distributed storage system 100 comprises more than the n storage devices. In this situation, it is preferable for the coordinator to identify the n storage devices in order to reduce network traffic. Alternatively, the coordinator does not identify the n storage devices.

Preferably, the coordinator randomly picks m of the n storage devices holding the jth-stripe of erasure coded data as targets in a second read stripe step 204. Alternatively, the coordinator uses a criterion for picking the m storage devices such as the m storage devices which hold the m data blocks. Alternatively, the coordinator does not pick the m storage devices. In this situation, each of the n storage devices is an effective target.

By identifying the m storage devices as targets in the second read stripe step 204, the method reduces the amount of network traffic associated with reading the stripe of the erasure coded data. This is advantageous when network resources are under heavy use or when the ratio of parity blocks to data blocks is high. For example, if there are five data blocks and two parity blocks, not identifying the targets increases data transfers by 40%. In contrast, if there are five data blocks and 4 parity blocks, not identifying the targets increases the data transfers by 80%.

The coordinator sends read request messages to the n storage devices in a third read stripe step 206. Preferably, the read request messages identify the jth-stripe and the targets. Alternatively, the read request messages do not identify the targets. As noted above, the coordinator can be one of the n storage devices. In this situation, the coordinator in effect sends the read request message to itself.

Each of the n storage devices holds one of the stripe blocks of the jth-stripe. The stripe block within any particular storage device of the n storage devices is referred to as a jth-block.

Each of the storage devices comprises a log of completed writes and a list of pending write orders. The log of completed writes—log()—comprises entries which include a jth-block identifier that identifies the jth-block that was stored, a timestamp for the completed write of the jth-block, and a physical block within the storage device that holds the jth-block. The list of pending write orders—ord-ts()—comprises the jth-block that was to be stored and a write order timestamp associated with the write order. The log of completed writes and the list of pending write orders for a particular storage device are stored in persistent storage within the particular storage device. Preferably, the log and the list are stored in NVRAM. Alternatively, the log or the list or both are stored on a storage media of the storage device.

Note that previous versions of the jth-block identified in the log are each stored in different physical blocks within the storage device from the physical block within the storage device that holds the jth-block that was most recently stored. That is, if the log identifies a most recent version of the jth-block and a previous version of the jth-block, the most recent version is stored in a first physical block and the previous version is stored in a second physical block. Alternatively, the most recent version is stored in NVRAM until the coordinator performs a garbage collection procedure which notifies the storage device that the physical block holding the previous version can be overwritten with the most recent version.

Each of the n storage devices that are operating correctly looks to log(jth-block) to determine a maximum timestamp (i.e., a most recent timestamp) for the jth-block and labels this as a validating timestamp—val-ts—in a fourth read stripe step 208. A correctly operating storage device is one which does not crash or one which eventually stops crashing. Each of these n storage devices then compares the val-ts to the ord-ts(jth-block) in a fifth read stripe step 210. If the val-ts is no less than the ord-ts(jth-block), the storage device assigns a true status. Preferably, if the val-ts is less than the ord-ts(jth-block), the storage device assigns a false status. Alternatively, if the val-ts is less than the ord-ts(jth-block), the storage device does not assign a status, which produces an effective false status.

Preferably, each of the n storage devices that are operating correctly sends a read reply message in a sixth read stripe step 212 or a seventh read stripe step 214 depending upon whether the storage device has the true status or the false status, respectively. The read reply message includes the true status or the false status and, if the storage device is one of the targets and it has the true status, the storage device returns the jth-block (i.e., the most recent version of the jth-block). Alternatively, each of the n storage devices returns the read reply message only if it has the true status.

The coordinator determines whether there is a quorum of the reply messages having the true status, whether the quorum includes matching val-ts's, and whether the quorum includes the targets in eighth, ninth, and tenth read stripe steps, 216, 218, and 220. If the coordinator receives a quorum of true status responses, which include the matching val-ts's and the targets also with the matching val-ts's, the coordinator decodes the jth-stripe of data from the m stripe blocks in an eleventh read stripe step 222. The coordinator then sends the jth-stripe of data to the client.

If the coordinator does not receive the quorum of true status responses or the quorum does not include the matching val-ts's or the quorum does not include the m stripe blocks, the coordinator preferably initiates a recover operation for the jth-stripe of erasure coded data in a twelfth read stripe step 224. If the recover operation is successful, the recover operation also provides the jth-stripe of data to the coordinator, which sends it to the client.

Figure 3A:
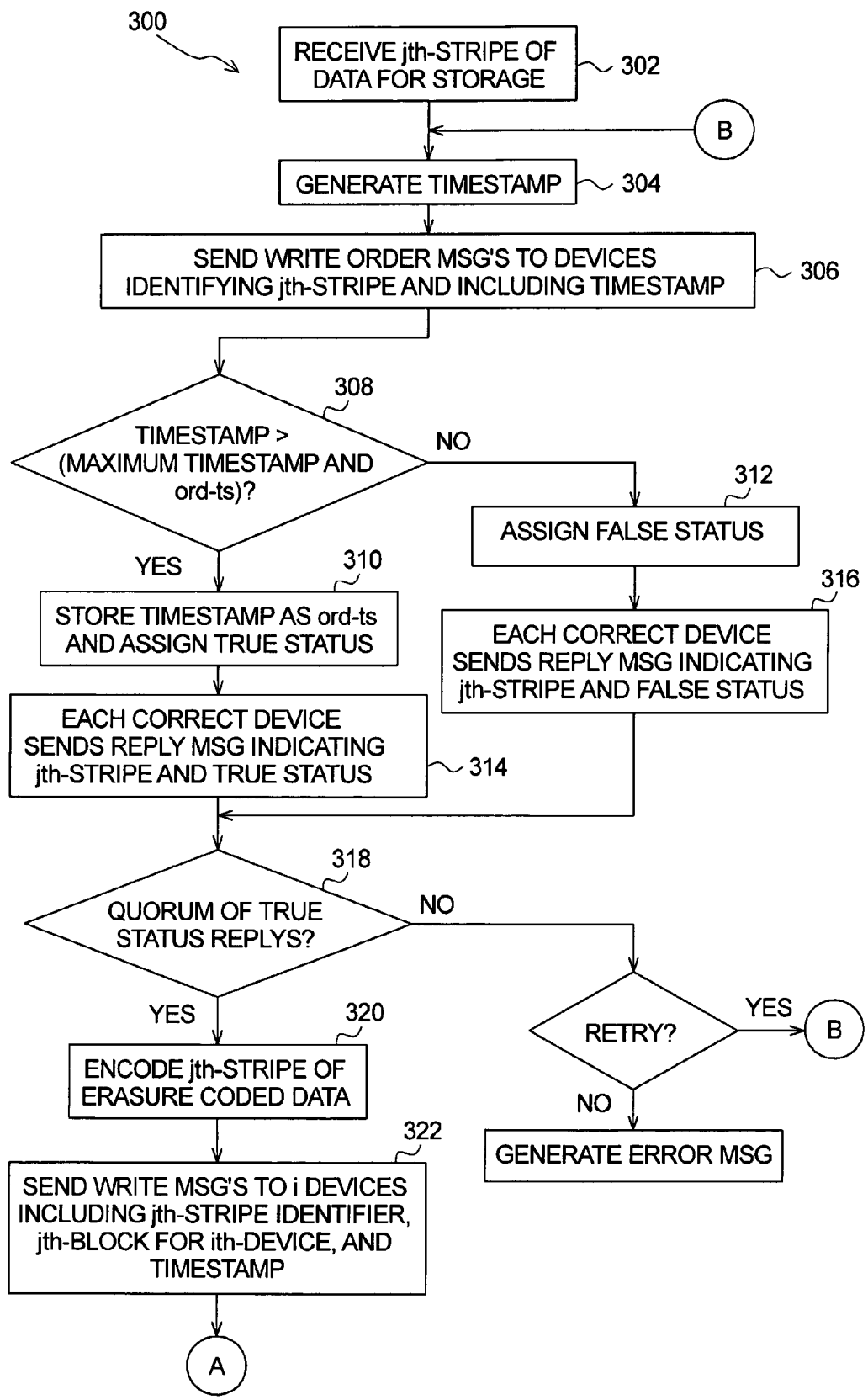
FIGS. 3A and 3B illustrate a method of writing a stripe of erasure coded data as a flow chart according to an embodiment of the present invention.
Figure 3B:
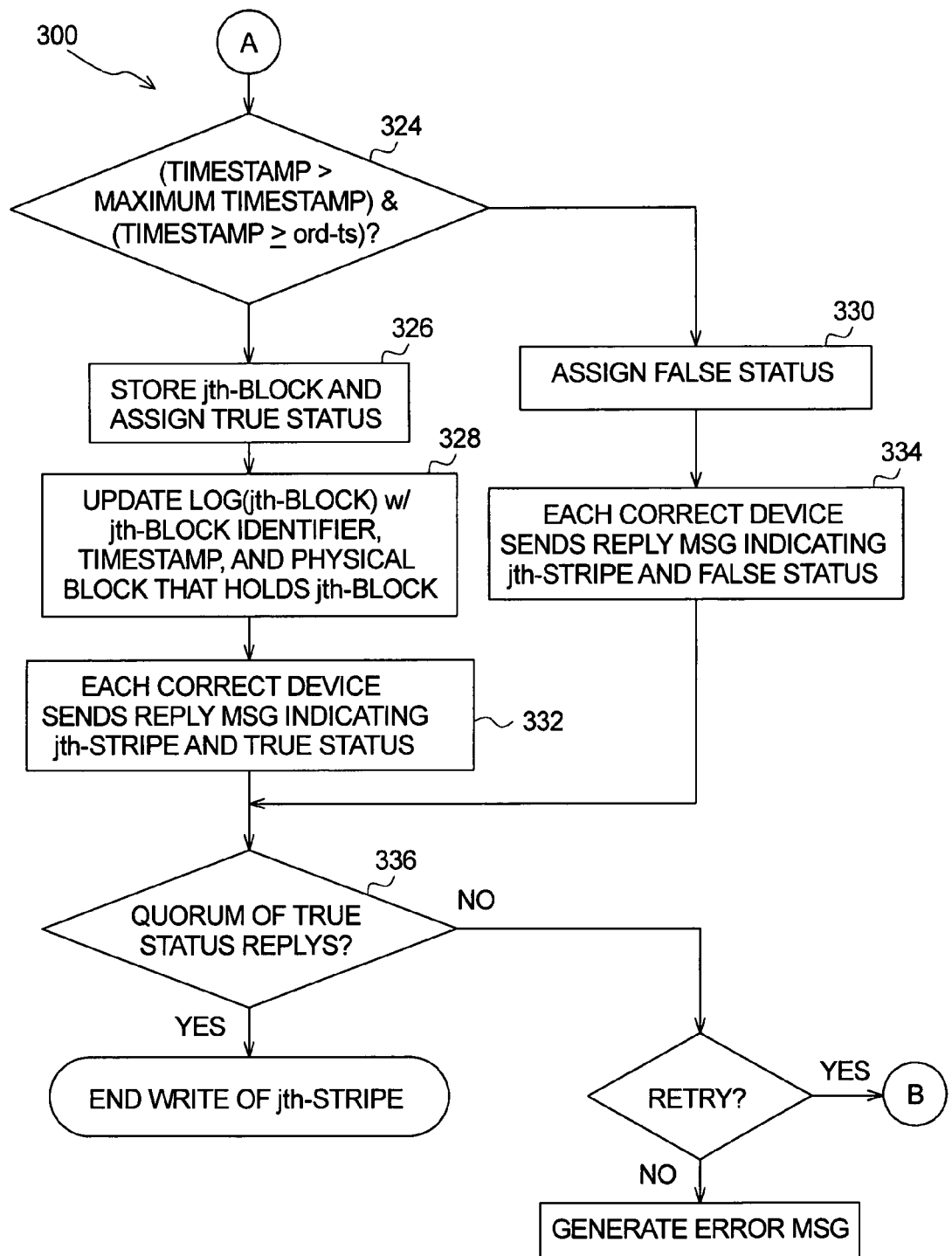

An embodiment of the method of writing the stripe of erasure coded data is illustrated as a flow chart in FIGS. 3A and 3B. The method of writing the stripe of erasure coded data 300 begins with the coordinator receiving a jth-stripe of data for storage in a first write stripe step 302. According to one embodiment of the method, the coordinator identifies the n storage devices which are to store the data. According to another embodiment of the method, the distributed storage system contains only the n storage devices upon which the stripe of erasure coded data is to be stored negating a need to identify the n storage devices.

The method continues with the coordinator generating a timestamp in a second write stripe step 304. The coordinator then sends a write order message to each of the n storage devices in a third write stripe step 306. Each write order message comprises a jth-stripe identifier and the timestamp. The coordinator can be one of the n storage devices. In this situation, the coordinator effectively sends the write order message to itself.

Each of the n storage devices that are operating correctly compares the timestamp to a maximum timestamp for the jth-block from log(jth-block) and to the ord-ts(jth-block) in a fourth write stripe step 308. If both the maximum timestamp and the ord-ts(jth-block) are less than the timestamp, the storage device stores the timestamp as ord-ts(jth-block) and the storage device assigns a true status to the pending write of the jth-block in a fifth write stripe step 310. If not, the storage device preferably assigns a false status to the pending write in a sixth write stripe step 312. Alternatively, if not, the storage device does not assign the false status, which produces an effective false status.

Preferably, each of the n storage devices that are operating correctly sends a write order reply message to the coordinator including the jth-stripe identifier and either the true status or the false status in a seventh step 314 or and eighth step 316, respectively. Alternatively, only the storage devices that have the true status send the write order reply messages to the coordinator.

The coordinator determines whether there is a quorum of the write order reply messages having the true status in a ninth write stripe step 318. If the coordinator receives the quorum of true status responses, the coordinator encodes the jth-stripe of data as the jth-stripe of erasure coded data in a tenth write stripe step 320. The jth-stripe of erasure coded data comprises the n stripe blocks, which preferably comprise the m data blocks and the p parity blocks. Alternatively, the n stripe blocks comprise blocks using another erasure coding scheme.

Preferably, if the coordinator does not receive a quorum of true status responses in the ninth write stripe step 318, the coordinator returns to the second write stripe step 304. In this situation, the coordinator may wait for a period of time to avoid failure due to concurrent writes. While concurrent writes are unlikely, they are possible. If the write keeps failing, the coordinator can use an exponential backoff to assure that the failures are not due to the concurrent writes. Alternatively, the coordinator sends a message to the client indicating a failure to store the jth-stripe of data.

The method continues with the coordinator sending a write message to each of the n devices in an eleventh write stripe step 322. The write message sent to an ith-device comprises the jth-stripe identifier, the jth-block of data destined for the ith-device, and the timestamp, where the ith-device is indicated by a counter $i \in \{1, 2, 3, \ldots, n\}$.

Alternatively, but with much lower network transmission efficiency and computation efficiency, the write message sent to each storage device comprises the jth-stripe identifier, the jth-stripe of data, and the timestamp. The m of n devices then store the m data blocks and the p of n devices encode and store their respective parity blocks.

Each of the n storage devices that are operating correctly again compares the timestamp to the maximum timestamp for the jth-block from log(jth-block) and to the ord-ts(jth-block) in a twelfth write stripe step 324. If the maximum timestamp is less than the timestamp and the ord-ts(jth-block) is no greater than the timestamp, the storage device stores the jth-block and assigns a true status to the write of the jth-block in a thirteenth write stripe step 326. In this situation, the storage device also updates the log of completed writes—log()—with the jth-block identifier, the timestamp, and the physical block within the storage device that holds the jth-block in a fourteenth write stripe step 328. If not, the storage device preferably assigns a false status to the write in a fifteenth write stripe step 330. Alternatively, if not, the storage device does not assign the false status, which produces an effective false status.

Each of the n storage devices that are operating correctly send a write reply message to the coordinator including the jth-stripe identifier and either the true status or the false status in a sixteenth write stripe step 332 or a seventeenth write stripe step 334, respectively. Alternatively, each of the n storage devices returns the write reply message only if it has the true status.

The coordinator determines whether there is a quorum of the write reply messages having the true status in an eighteenth write stripe step 336. If the coordinator receives a quorum of true status responses, the coordinator can send a message to the client indicating that the jth stripe of data has been stored. Alternatively, the coordinator can consider the storing of the jth-stripe complete and do nothing further.

If the coordinator does not receive a quorum of true status responses, the coordinator can return to the second write stripe step 304 or the coordinator can send a message to the client indicating a failure to store the jth-stripe of data.

Preferably, the coordinator performs a garbage collection procedure after performing the method of writing the stripe of erasure coded data 300. In an embodiment of the garbage collection procedure, the coordinator asynchronously instructs the n storage devices to garbage collect the log entries for the jth-block up to the timestamp for the completed write of the jth-block. This frees up the physical blocks on the storage devices having log entries for the jth-block with timestamps earlier than the timestamp for the completed write. Alternatively, the coordinator does not perform the garbage collection procedure. In this situation, some type of garbage collection procedure is desirable in order to efficiently use available storage on the storage devices and also to limit a size of the logs on the storage devices.

Figure 4A:
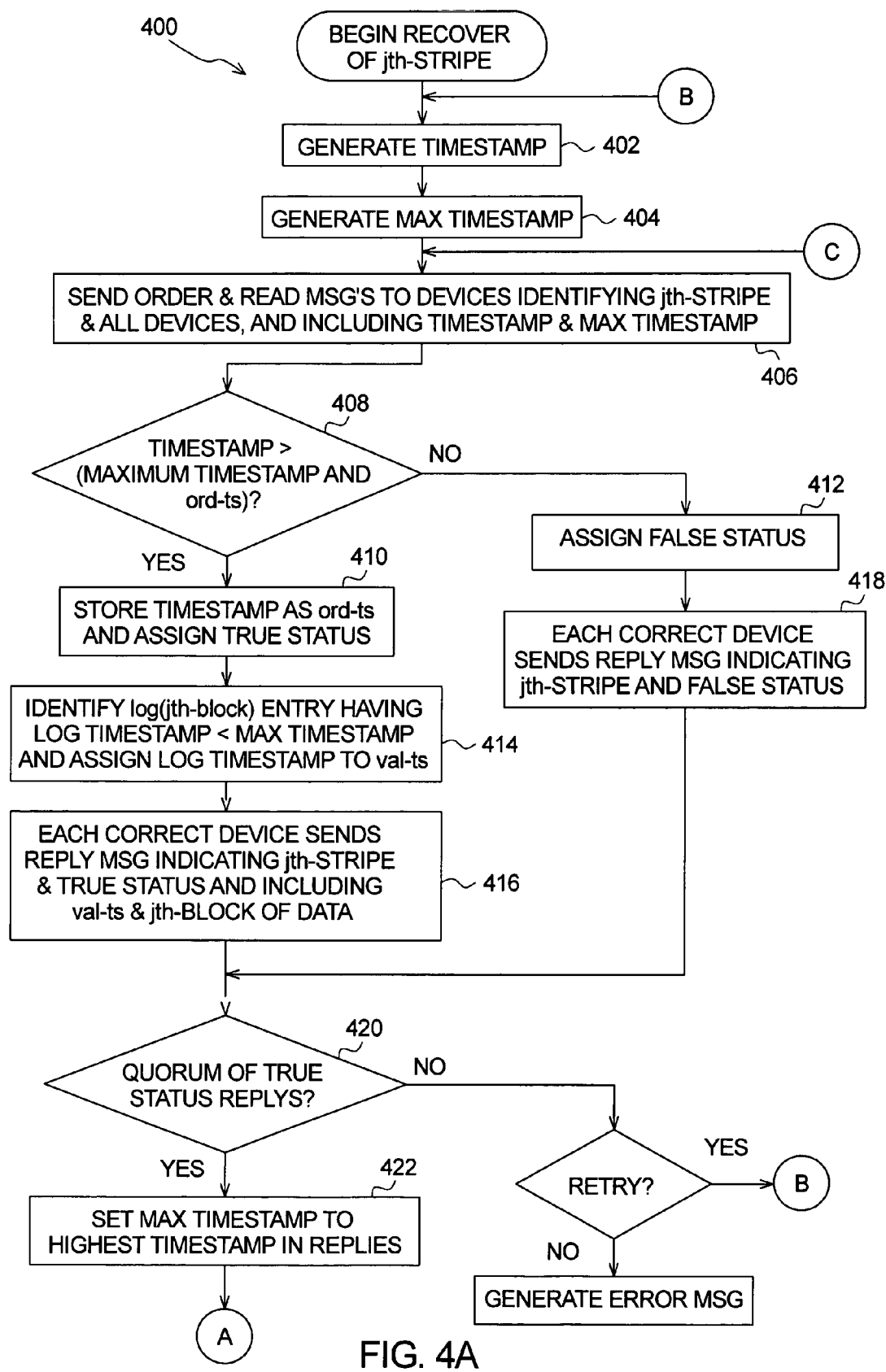
FIGS. 4A and 4B illustrate a method of recovering a stripe of erasure coded data as a flow chart according to an embodiment of the present invention.
Figure 4B:
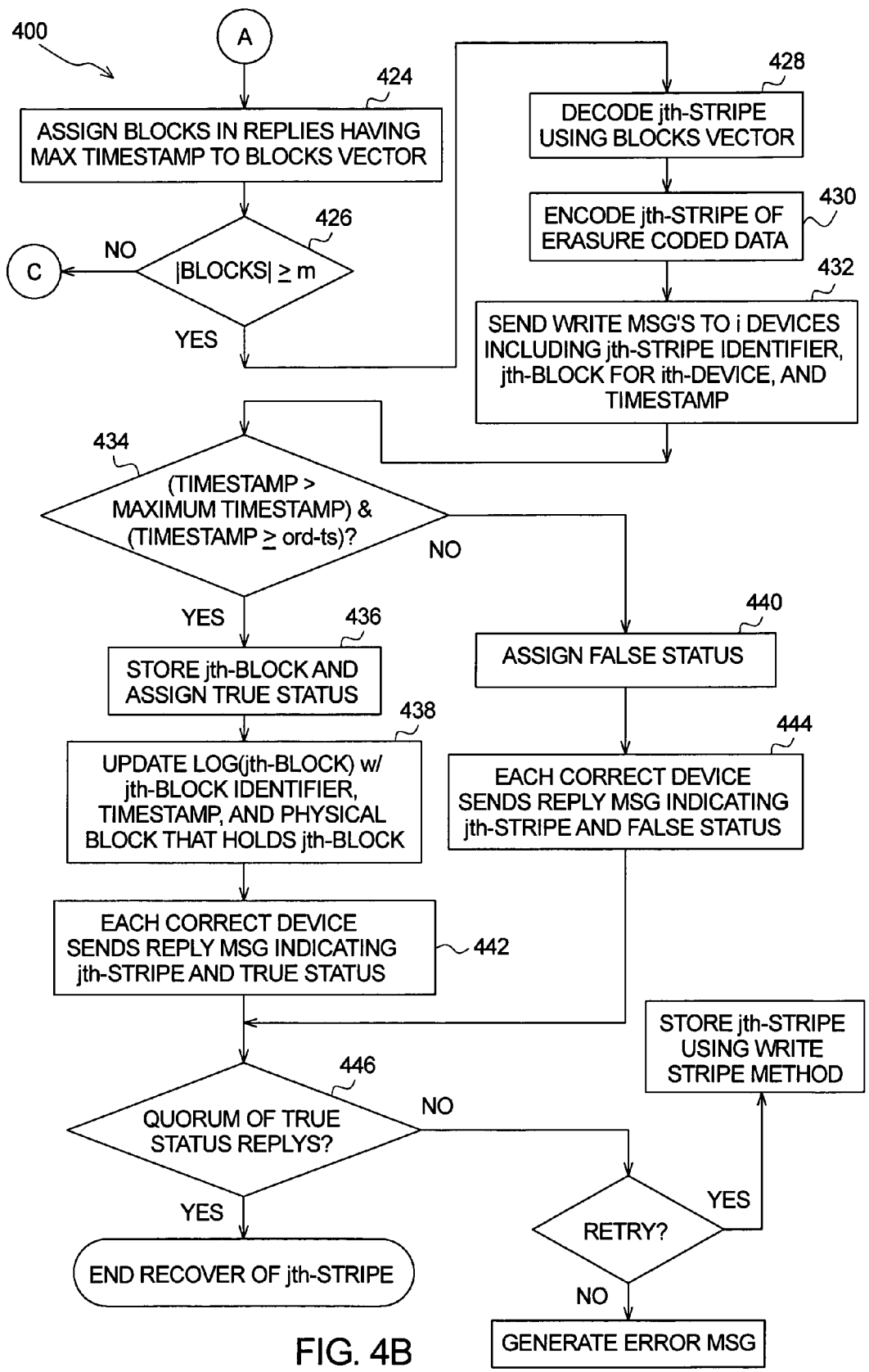

An embodiment of the method of recovering the stripe of erasure coded data is illustrated as a flow chart in FIGS. 4A and 4B. The method of recovering the stripe of erasure coded data 400 begins with the coordinator generating a timestamp in a first recovery step 402. The coordinator then sets a max timestamp with an initial value that exceeds any timestamp generated by the system other than another max timestamp in a second recovery step 404. The initial value is referred to as a high timestamp.

The method continues with the coordinator sending an order & read message to each of the n storage devices holding a jth-stripe of erasure coded data in a third recovery step 406. Each of the order & read message comprises a jth-stripe identifier, an all n devices identifier, the max timestamp, and the timestamp.

Each of the n storage devices that are operating correctly compares the timestamp to the maximum timestamp (i.e., the most recent timestamp) for the jth-block from log(jth-block) and to the ord-ts(jth-block) in a fourth recovery step 408. If both the maximum timestamp and the ord-ts(jth-block) are less than the timestamp, the storage device stores the timestamp as ord-ts(jth-block) and the storage device assigns a true status to the pending order & read of the jth-block in a fifth recovery step 410. If both the maximum timestamp and the ord-ts(jth-block) are not less than the timestamp, the storage device assigns a false status to the pending order & read in a sixth recovery step 412. It is noted that the maximum timestamp is distinct from the max timestamp. The max timestamp has the initial value of the high timestamp and is generated by the coordinator. Each of the n storage devices determines the maximum timestamp by referring to the log(jth-block). The maximum timestamp is the most recent timestamp for the jth-block in the log(jth-block).

Each of the n storage devices that are operating correctly and have the true status identifies a maximum log(jth-block) entry that has a log timestamp below the max timestamp in a seventh recovery step 414. The log timestamp for the maximum log(jth-block) entry becomes a validating timestamp—val-ts. The maximum log(jth-block) entry also identifies a physical block on the storage device that holds the jth-block corresponding to the val-ts.

Each of the n storage devices that are operating correctly sends an order & read reply message to the coordinator including jth-stripe identifier and the true status or the false status in a eighth recovery step 416 or a ninth recovery step 418, respectively. If the storage device has the true status, the read & order reply message also includes the validating timestamp and the jth-block of data. Alternatively, only the storage devices that have the true status send the order & read reply messages to the coordinator.

The coordinator then determines whether there is a quorum of true status responses in a tenth recovery step 420. If the coordinator receives the quorum of true responses, the coordinator sets the max timestamp to a highest val-ts in the read & order reply messages that include the true status in an eleventh recovery step 422. The coordinator then assigns blocks in the reply messages having the max timestamp to a blocks vector in a twelfth recovery step 424.

If a quorum of true status responses is not received by the coordinator from the storage devices, the coordinator can then reinitiate the recover by returning to the first recovery step 402 or the coordinator can generate an error message.

The coordinator then determines whether the blocks vector includes at least m of the stripe blocks in a thirteenth step 426. If the blocks vector includes at least m of the stripe blocks, the coordinator decodes the blocks vector to form the jth-stripe of data in a fourteenth recovery step 428. The coordinator then encodes the jth-stripe of erasure coded data in a fifteenth recovery step 430. If the blocks vector does not include at least m of the stripe blocks, the coordinator returns to the third recovery step 406.

Once the jth-stripe of erasure coded data has been encoded in the fifteenth recovery step 430, the coordinator sends a write message to each of the n devices in a sixteenth recovery step 432. The write message sent to the ith-device comprises the jth-stripe identifier, the jth-block of data destined for the ith-device, and the timestamp, where the counter $i \in \{1, 2, 3, \ldots, n\}$.

Alternatively, but with much lower network transmission efficiency and computation efficiency, the write message sent to each storage device comprises the jth-stripe identifier, the jth-stripe of data, and the timestamp. The m of n devices then store the m data blocks and the p of n devices encode and store their respective parity blocks.

Each of the n storage devices that are operating correctly again compares the timestamp to the maximum timestamp for the jth-block from log(jth-block) and to the ord-ts(jth-block) in a seventeenth recovery step 434. If the maximum timestamp is less than the timestamp and the ord-ts(jth-block) is no greater than the timestamp, the storage device stores the jth-block and assigns a true status to the write of the jth-block in an eighteenth recovery step 436. In this situation, the storage device also updates the log of completed writes—log()—with the jth-block identifier, the timestamp, and the physical block within the storage device that holds the jth-block in a nineteenth recovery step 438. If the maximum timestamp is not less than the timestamp or the ord-ts(jth-block) is greater than the timestamp, the storage device preferably assigns a false status to the write in a twentieth recovery step 440.

Each of the n storage devices that are operating correctly send a write reply message to the coordinator including the jth-stripe identifier and either the true status or the false status in a twenty-first recovery step 442 or a twenty-second recovery step 444, respectively.

The coordinator determines whether there is a quorum of true status responses in a twenty-third recovery step 446. If the coordinator receives the quorum of true status responses, the coordinator can send a message to the client indicating that the jth stripe of data has been stored. Alternatively, the coordinator can consider the storing of the jth-stripe complete and do nothing further.

If the coordinator does not receive a quorum of true status responses, the coordinator can proceed to the method of writing the stripe of erasure coded data 300 (FIGS. 3A and 3B). In this situation, the coordinator acts as both client and coordinator. Alternatively, the coordinator can generate an error message.

Preferably, the coordinator performs the garbage collection procedure after performing the method of recovering the stripe of erasure coded data 400. Alternatively, the coordinator does not perform the garbage collection procedure.

Figure 5:
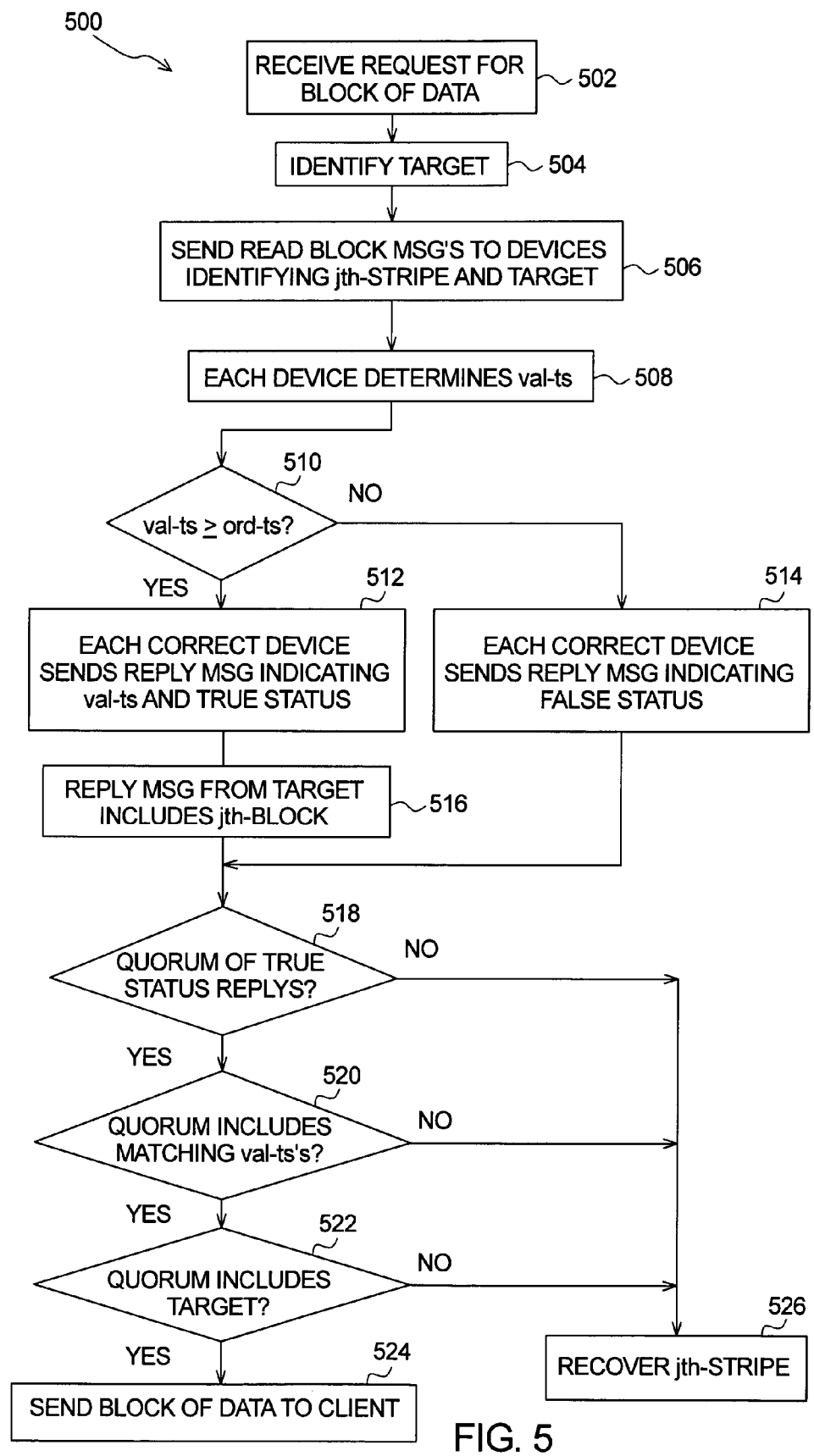
FIG. 5 illustrates a method of reading a block of data as a flow chart according to an embodiment of the present invention.

An embodiment of the method of reading a block of erasure coded data is illustrated as a flow chart in FIG. 5. The method of reading the block of data 500 begins when the coordinator receives a request for the block in a first read block step 502. The block of data is contained within a jth-stripe of erasure coded data and is located on an ith-device of n storage devices holding the jth-stripe of erasure coded data. If needed, the coordinator identifies the n storage devices which hold the jth stripe of erasure coded data. The coordinator identifies the ith-device holding the block of data as a target in a second read block step 504.

The method continues with the coordinator sending read block request messages to the n storage devices identifying the jth-stripe and the target in a third read block step 506. Each of the n devices holds a stripe block of the jth-stripe. The stripe block within any of the n devices is referred to as a jth-block.

Each of the storage devices comprises a log of completed writes and a list of pending write orders. The log of completed writes—log()—identifies the jth-block that was stored, the timestamp for the completed write of the jth-block, and the physical block within the storage device that holds the jth-block. The list of pending write orders—ord-ts()—comprises the jth-block that was to be stored and the timestamp associated with the write order.

Each of the n storage devices that are operating correctly looks to log(jth-block) to determine the maximum timestamp for the jth-block and labels this val-ts in a fourth read block step 508.

Each of these n storage devices then compares the val-ts to the ord-ts(jth-block) in a fifth read block step 510. If val-ts is no less than ord-ts(jth-block), the storage device assigns a true status. If val-ts is less than ord-ts(jth-block), a false status is assigned.

Each of the n devices that are operating correctly sends a read reply message to the coordinator that includes the true status or the false status in a sixth read block step 512 or a seventh read block step 514. If the storage device is the target and it has the true status, the storage device returns the jth-block from the ith-device in an eighth read block step 516. Alternatively, only the storage devices having the true status send the read reply messages.

The coordinator then determines whether there is a quorum of true status responses, whether the quorum includes matching val-ts's, and whether the quorum includes the target in ninth, tenth, and eleventh read block step, 518, 520, and 522. If the coordinator receives the quorum of true status response and the quorum includes the matching val-ts's and the target, the coordinator sends the block of data to the client in a twelfth read block step 524.

If the coordinator does not receive the quorum of true status responses or the quorum does not include the matching val-ts's or the target, the coordinator initiates a recover operation for the jth-stripe of erasure coded data in a thirteenth read block step 526. If the recover operation is successful, the recover operation also provides the jth-block of data to the coordinator, which sends it to the client.

Figure 6A:
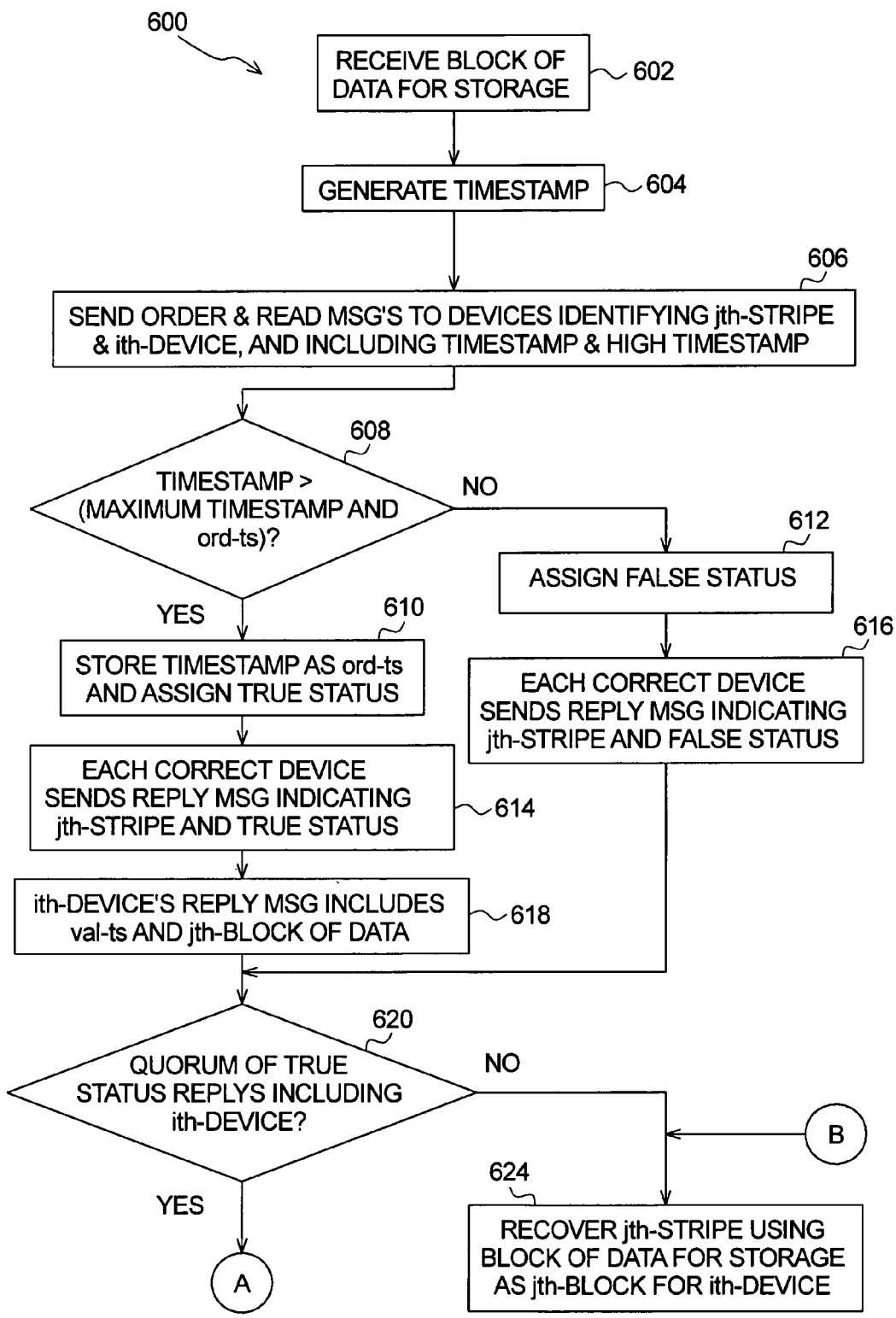
FIGS. 6A and 6B illustrate a method of writing a block of data as a flow chart according to an embodiment of the present invention.
Figure 6B:
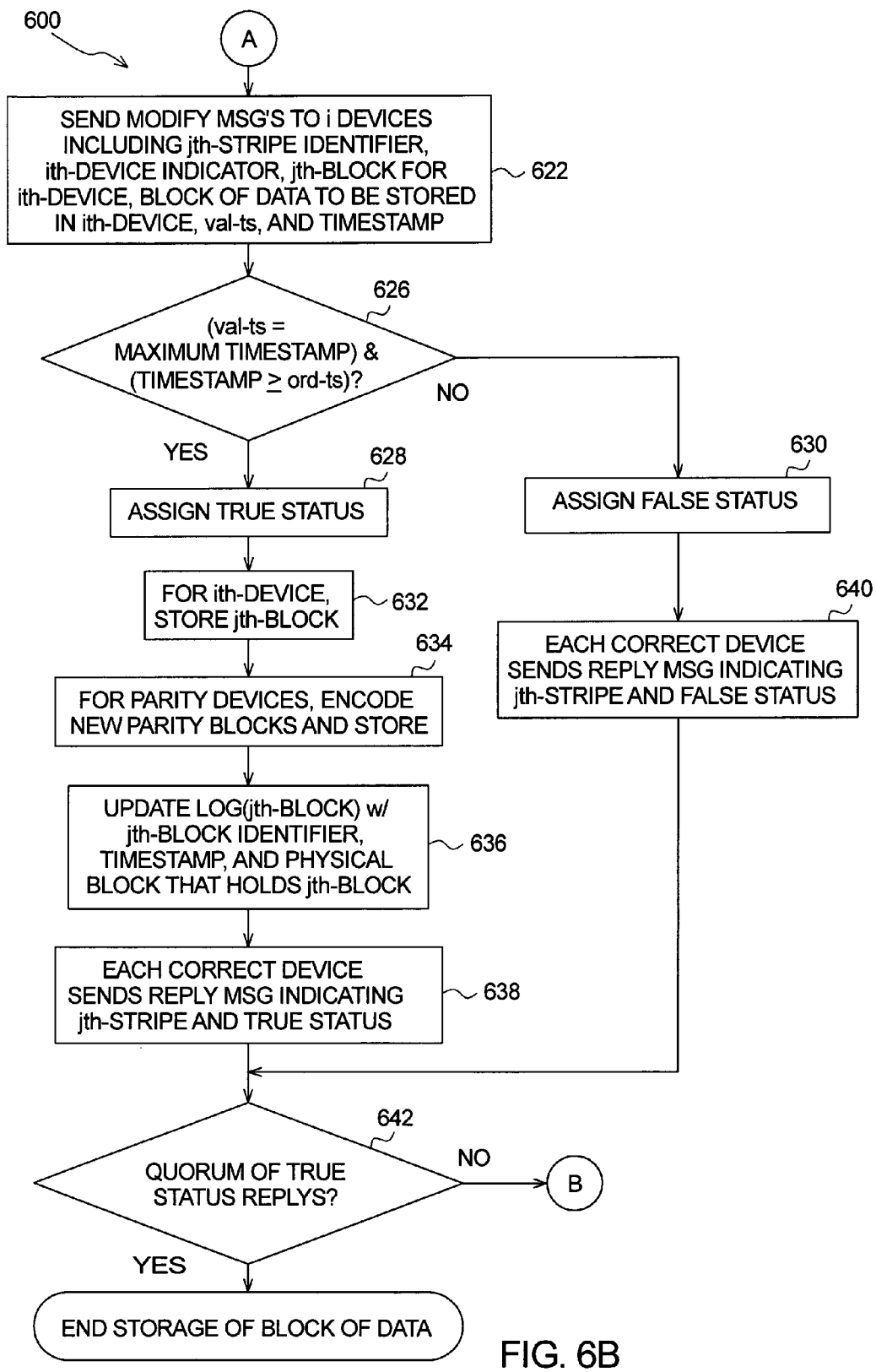

An embodiment of the method of writing a block of data to a stripe of erasure coded data is illustrated as a flow chart in FIGS. 6A and 6B. The method of writing the block of data 600 begins with the coordinator receiving the block of data for storage in a first write block step 602. The block of data is destined for storage within a jth-stripe of erasure coded data. The block of data is to be stored on an ith-device of n storage devices holding the jth-stripe of erasure coded data, where $i \in \{1, 2, 3, \ldots, m\}$.

The method continues with the coordinator generating a timestamp in a second write block step 604. The coordinator then sends order & read messages to the n storage devices in a third write block step 606. Each order & read message comprises a jth-stripe identifier, an ith-device indicator, the high timestamp, and the timestamp. The high timestamp has a value that exceeds any timestamp generated by the distributed storage system.

Each of the n storage devices that are operating correctly compares the timestamp to the maximum timestamp for the jth-block from log(jth-block) and to the ord-ts(jth-block) in a fourth write block step 608. If both are less than the timestamp, the storage device stores the timestamp as ord-ts(jth-block) and the storage device assigns a true status to the pending order & read of the jth-block in a fifth write block step 610. If not, the storage device assigns a false status to the pending order & read in a sixth write block step 612.

Each of the n storage devices that are operating correctly and have the true status identifies a maximum log(jth-block) entry, which is below the high timestamp. The maximum log(jth-block) entry forms a validating timestamp and it identifies a physical block on the storage device that holds the jth-block corresponding to the validating timestamp.

Each of the n storage devices that are operating correctly sends an order & read reply message to the coordinator including jth-stripe identifier, and the true status or the false status in a seventh step 614 or an eighth step 616, respectively. If the ith-device has the true status, the ith-device adds the validating timestamp and the jth-block of data from the ith-device to the order & read reply message in a ninth write block step 618.

The coordinator then determines whether there is a quorum of true status responses including the ith-device in a tenth write block step 620. If the quorum of true status responses is received by the coordinator including a true status response for the ith-device, the coordinator sends modify messages to the n storage devices in an eleventh write block step 622. Each of the modify messages comprises the jth-stripe indicator, the ith-device indicator, the jth-block in the ith-device, the block of data to be stored in the ith-device, the timestamp for the jth-block in the ith-device, and the timestamp generated in the second write block step 604. Alternatively, the modify messages sent to the storage devices holding the m data blocks other than the ith-device do not include the jth-block in the ith-device nor the block of data to be stored in the ith-device. Alternatively, the modify message sent to the ith-device does not include the jth-block in the ith-device.

If a quorum of true status responses is not received by the coordinator from the storage devices or a true status is not received from the ith-device, the coordinator performs a recovery of the jth-stripe in an twelfth write block step 624. The recovery uses the timestamp generated in the second write block step 602. The recovery uses the data block destined for the ith-device as the jth-block in the ith-device. The recovery also uses the data block for encoding new parity blocks.

Each of the n storage devices that are operating correctly determines whether the timestamp for the jth-block equals the maximum timestamp for the jth-block from log(jth-block) for a particular device and whether the timestamp is no less than ord-ts(jth-block) for the particular device in a thirteenth write block step 626. If both these conditions are met, the storage device assigns a true status to the jth-block in a fourteenth write block step 628. If both conditions are not met, the storage device preferably assigns a false status in a fifteenth write block step 630. Alternatively, the storage device does not assign the false status.

If the ith-device has the true status, it stores the block of data in a sixteenth write block step 632. Each of the p parity devices that have the true status encodes and stores the jth-parity block using the jth-block of data in the ith-device, the block of data destined for the ith-device, and an existing jth-parity block in the parity device in a seventeenth write block step 634.

Each of the n storage devices having the true status updates the log(jth-block) with the timestamp and with the physical block that holds the jth-block of data in an eighteenth write block step 636.

Each of the storage devices that are operating correctly sends a modify reply message to the coordinator, which includes the jth-stripe indicator, and the true status or the false status in a nineteenth step 638 or a twentieth step 640, respectively.

The coordinator determines whether there is a quorum of true status responses and in a twenty-first write block step 642. If the coordinator receives the quorum of the true status responses, the write of the data block has been completed successfully. If the coordinator does not receive a quorum of the true status responses, the coordinator performs the recover of the twelfth write block step 624.

Preferably, the coordinator performs the garbage collection procedure after performing the method of writing the block of data 600. Alternatively, the coordinator does not perform the garbage collection procedure.

It will be readily apparent to one skilled in the art that, in the context of the methods of reading or writing a block of erasure coded data of the present invention and in the context of the method of recovering a stripe of erasure coded data, references to the stripe of erasure coded data refers to a collection of data blocks which are erasure coded. These references to the stripe do not necessarily mean that the stripe is intended to be read as a stripe or that the stripe was written as a stripe. That is, these references to the stripe do not necessarily mean that a technique of striping (concurrently reading or writing a stripe of data blocks) is to be performed or was performed.

Since the methods of the present invention operate on the storage devices 102 each of which include the CPU 108 and since the methods of the present invention utilize timestamps to ensure data integrity, the methods of the present invention are asynchronous and do not rely on a central controller to maintain the data integrity. Further, clocks of the storage devices or other devices acting as a coordinator need not be synchronized. Preferably, a time synchronization algorithm maintains clock skew between the devices to a low value. Alternatively, the clock skew between the devices is kept within a limit that avoids excessive aborted writes.

Figure 7:
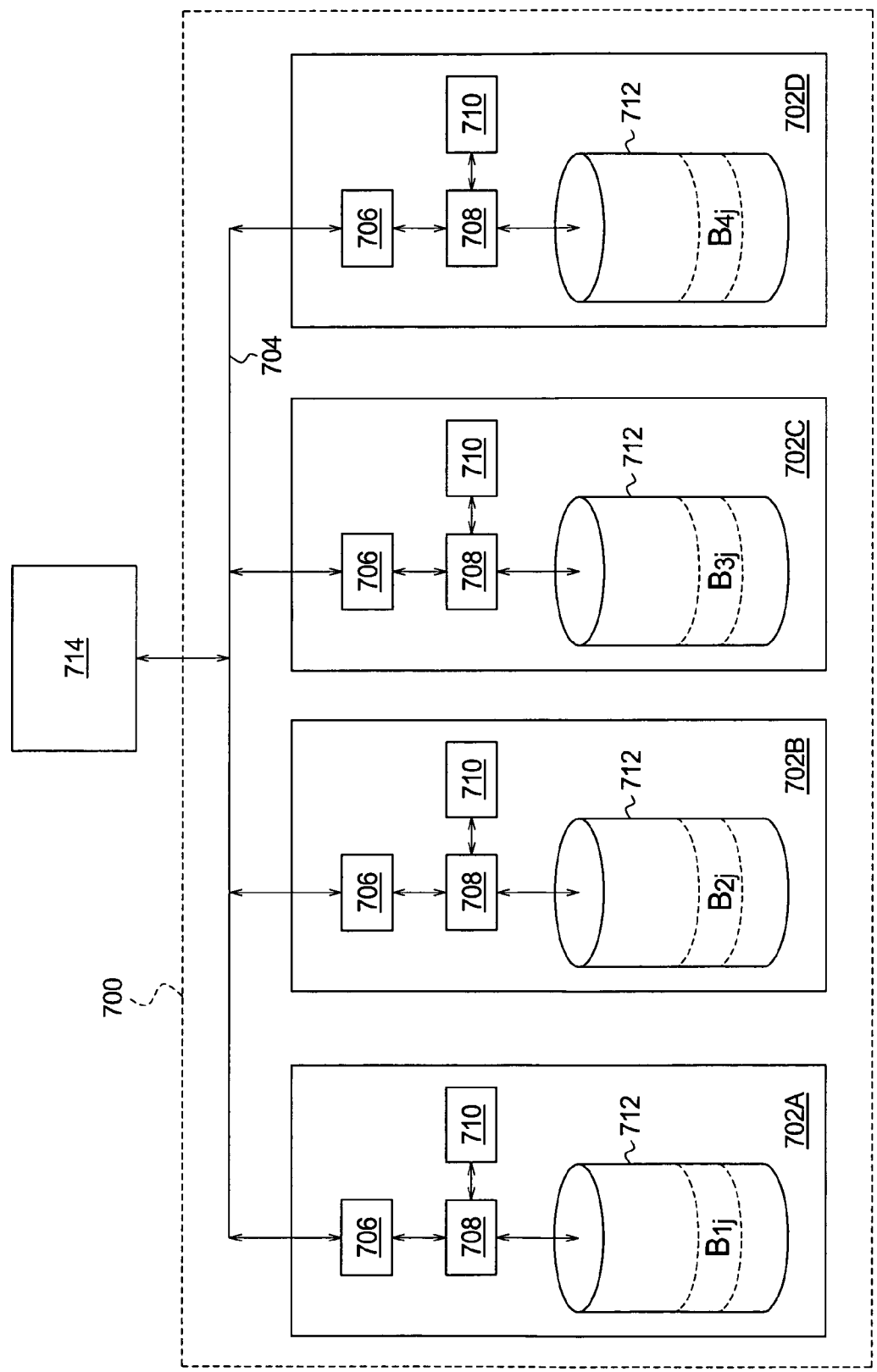
FIG. 7 schematically illustrates a distributed storage system and a client according to an embodiment of the present invention.

An embodiment of a distributed storage system of the present invention is illustrated schematically in FIG. 7. The distributed storage system 700 comprises first through fourth storage devices, 702A . . . 702D, which are coupled by a network 704. Preferably, each of the first through fourth storage devices, 702A . . . 702D, comprises a network interface 706, a CPU 708, an NVRAM (non-volatile RAM) 710, and a storage media 712, which are coupled to each other. Alternatively, one or more of the first through fourth storage devices, 702A . . . 702D, does not include the NVRAM 710. Preferably, the storage media 712 within the storage devices 102 comprises one or more disks. Alternatively, the storage media 712 within one or more of the first through fourth storage devices, 702A . . . 702D, comprises some other storage media such as a tape. A client 714 couples to the network 704 of the distributed storage system 700.

Embodiments of methods of the present invention are presented below with reference to the distributed storage system 700 and the client 714. In the embodiments a jth-stripe of erasure coded data is stored on the first through fourth storage devices, 702A . . . 702D; i.e., n equals 4. A first stripe block $B_{1j}$ is stored on the first storage device 702A. A second stripe block $B_{2j}$ is stored on the second storage device 702B. A third stripe block $B_{3j}$ is stored on the third storage device 702C. A fourth stripe block $B_{4j}$ is stored on the fourth storage device 702D. The first and second storage devices, 702A and 702B, store the data blocks; i.e., m equals 2. The third and fourth storage devices, 702C and 702D, store the parity blocks; i.e., p equals 2. Any one of the first through fourth storage devices, 702A . . . 702D, is allowed to be faulty; i.e., f equals 1. A quorum is any three of the first through fourth storage devices, 702A . . . 702D. In the embodiments discussed below, the first storage device 702A acts as the coordinator.

Figure 8:
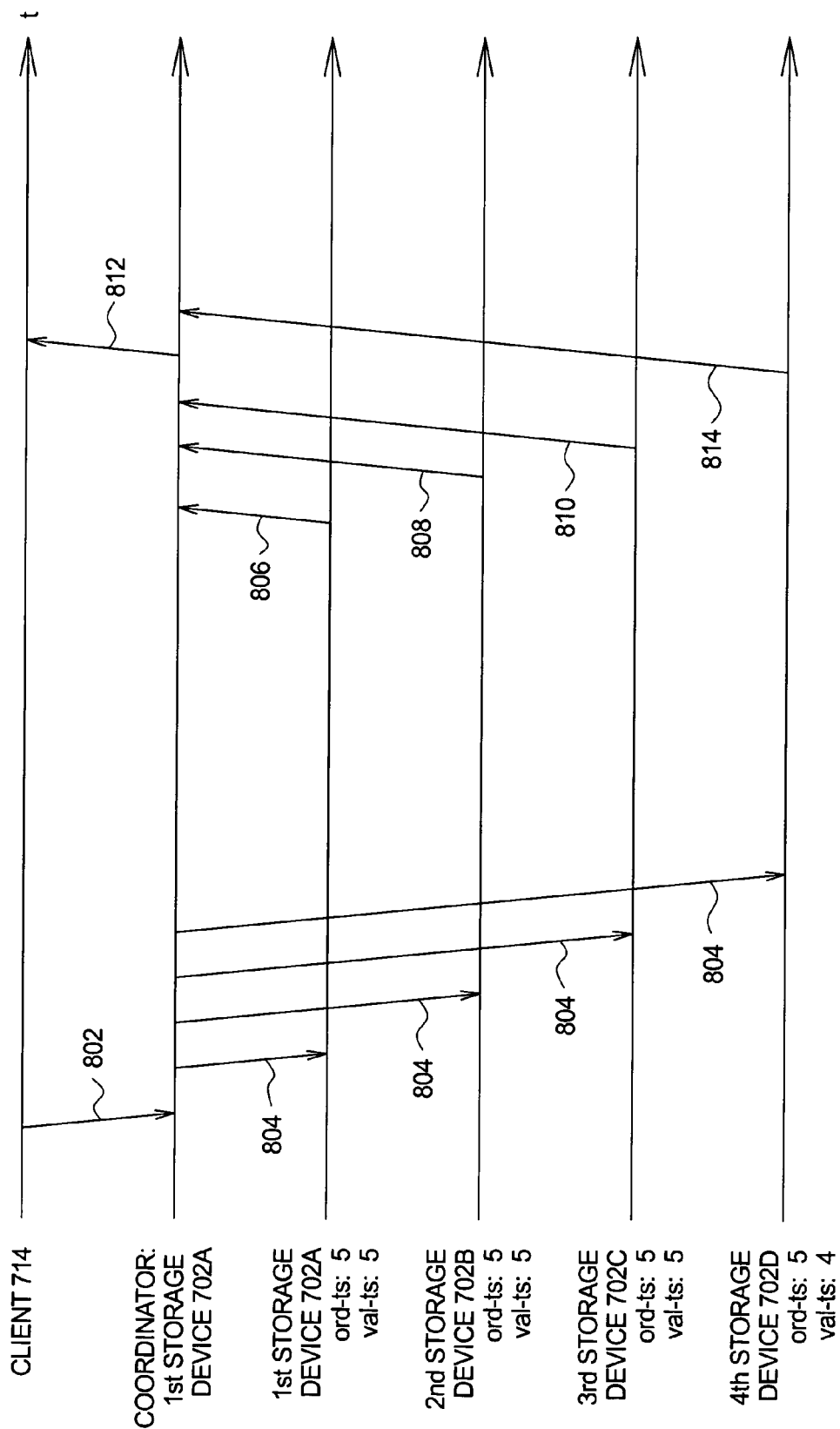
FIG. 8 illustrates a method of reading a stripe of erasure coded data as a timing diagram according to an embodiment of the present invention.

An embodiment of the method of reading the stripe of erasure coded data is illustrated as a timing diagram in FIG. 8. Time is increasing from left to right in the timing diagram of FIG. 8. The method begins with the client 714 requesting a jth-stripe of data that is stored across the first through fourth storage devices, 702A . . . 702D, as the jth-stripe of erasure coded data. This is illustrated as a first message 802 sent from the client 714 to the coordinator. The method continues with the coordinator sending read messages 804 to the first through fourth storage devices, 702A . . . 702D. Since the first storage device 702A acts as the coordinator, the read message 804 sent to the first storage device 702A comprises an effective message that preferably stays local to the first storage device 702A. Each of the read messages 804 identifies the jth-stripe and also identifies the second and third stripe blocks, $B_{2j}$ and $B_{3j}$, as targets.

Each of the first through third storage devices, 702A . . . 702C, has a val-ts of 5 and an ord-ts of 5 for the jth-block. Since the val-ts for each of the first through third storage devices, 702A . . . 702C, is no less than ord-ts, each of these devices is assigned a true status. The fourth storage device 702D has a val-ts of 4 and an ord-ts of 5. Since the val-ts is less than ord-ts for the fourth storage device 702D, the fourth storage device is assigned a false status.

The method continues with the first storage device 702A sending a first read reply message 806 to the coordinator; i.e., an effective message since the coordinator is the first storage device 702A. The first read reply message includes the true status and the val-ts of 5. The second storage device 702B sends a second read reply message 808 to the coordinator, which includes the true status, the val-ts of 5, and the second stripe block $B_{2j}$. The third storage device 702C sends a third read reply message 810 to the coordinator, which includes the true status, the val-ts of 5, and the third stripe block $B_{3j}$. At this point, the coordinator has received a quorum of true status responses which included matching val-ts's and the targets. So the coordinator decodes the jth-stripe of data and sends it to the client in a reply message 812. Later, the fourth storage device 702D responds with the false status in a fourth read reply message 814. But this is of no effect since the jth-stripe of data has been successfully read.

Figure 9:
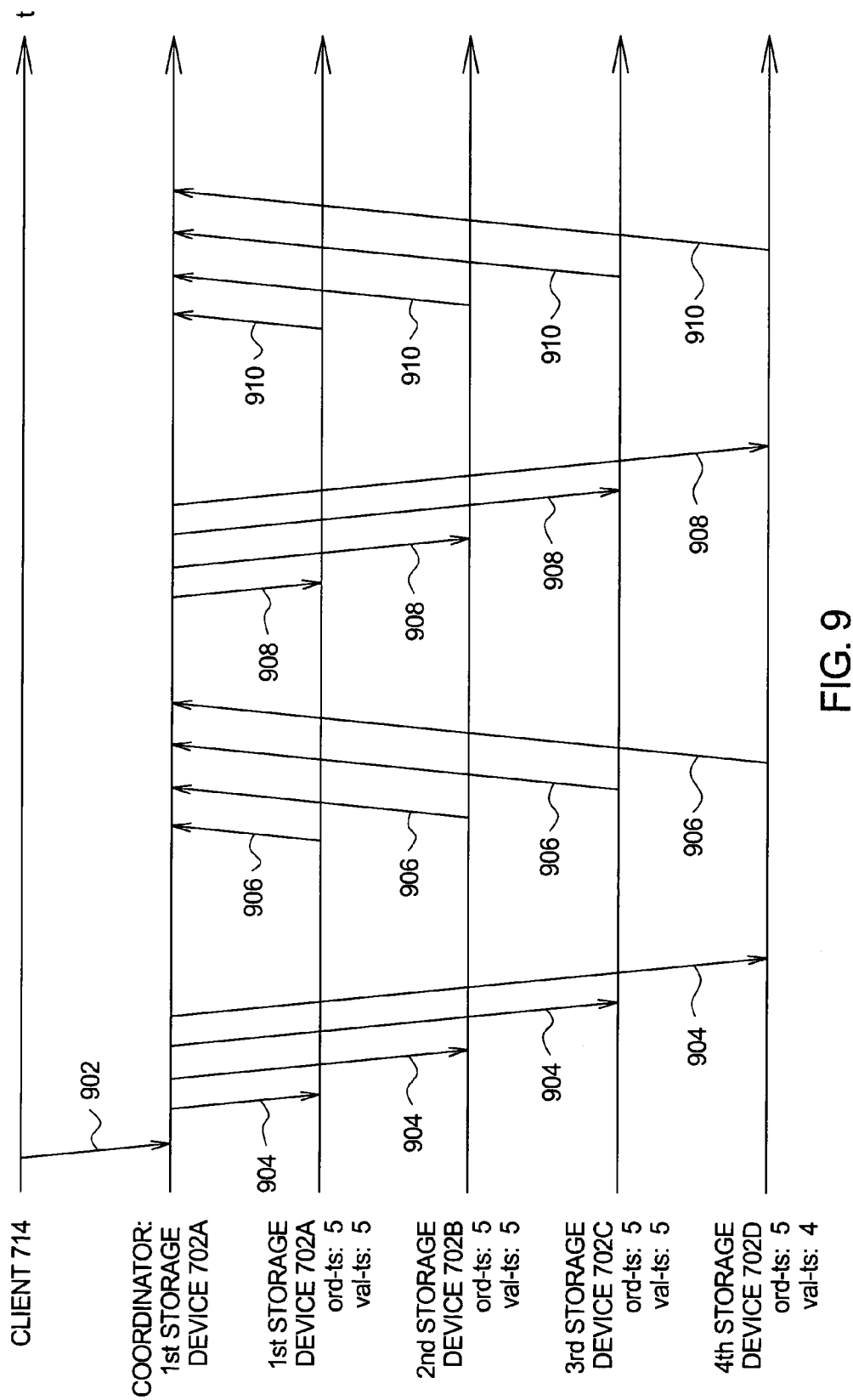
FIG. 9 illustrates a method of writing a stripe of erasure coded data as a timing diagram according to an embodiment of the present invention.

An embodiment of the method of writing the stripe of erasure coded data is illustrated as a timing diagram in FIG. 9. The method begins with the client 714 sending a jth-stripe stripe of data to the coordinator (the first storage device 702A) in a first message 902. Upon receiving the first message 902, the coordinator generates a timestamp of 8. The coordinator then sends write order messages 904 to the first through fourth storage devices, 702A ... 702D. Each of the write order messages 904 identify the jth-stripe and include the timestamp. Each of the first through fourth storage devices, 702A ... 702D, compares the timestamp to val-ts and ord-ts and assigns true statuses to each of the first through fourth storage devices, 702A ... 702D, since the timestamp is later than the val-ts and the ord-ts. Each of the the first through fourth storage devices, 702A ... 702D, also assigns the timestamp of 8 to the ord-ts. Each of the first through fourth storage devices, 702A ... 702D, then sends write order reply messages 906 to the coordinator indicating the jth-stripe and including the true status.

The method continues with the coordinator determining that there is a quorum of true status responses. Either at this time or before, the coordinator encodes the jth-stripe of data as the jth-stripe of erasure coded data. The coordinator then sends write messages 908 to each of the the first through fourth storage devices, 702A ... 702D. Each of the write messages 908 includes the jth-stripe identifier, the jth-block destined for the ith-device (where $i \in \{1, 2, 3, 4\}$), and the timestamp.

Upon receiving the write messages, each of the the first through fourth storage devices, 702A ... 702D, determines that the timestamp (which is 8) is later than the val-ts (which is 4 or 5) and that the timestamp is no earlier than the ord-ts (which is 8). Each of the first through fourth storage devices, 702A ... 702D, then stores the jth-block and assigns the true status. Each of the first through fourth storage devices, 702A ... 702D, also updates the log() with the jth-block identifier, the timestamp, and a physical block that holds the jth-block. Each of the first through fourth storage devices, 702A ... 702D, sends write reply messages 910, which include the jth-stripe indicator and the true status.

Upon receiving three of the read reply messages 910, the coordinator determines that there is a quorum of the true status responses, which ends the method of storing the jth-stripe of erasure coded data.

In an embodiment of the present invention, computer code resides on a computer readable memory, which is read into the coordinator. The computer code provides instructions for the coordinator and the storage devices to perform one or more of the methods of the present invention. The computer readable memory is selected from a group comprising a disk, a tape, a memory chip, or other computer readable memory.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of writing data comprising the steps of:
   receiving a data block for storage within a stripe of erasure coded data, the stripe comprising stripe blocks;
   sending a query message to each of a plurality of storage devices upon which the stripe of erasure coded data is stored;
   receiving a query reply message from each of at least a first quorum of the storage devices;
   sending a modify message to each of the storage devices; and
   receiving a write reply message from each of at least a second quorum of the storage devices, the first and second quorums each meeting a quorum condition of a number such that any two selections of the number of the stripe blocks intersect in a minimum number of the stripe blocks needed to decode the stripe.

2. The method of claim 1 wherein the stripe blocks comprise a first number of data blocks and a second number of parity blocks.

3. The method of claim 1 wherein the query message sent to the storage device upon which the data block is to be stored includes an identifier of the stripe of erasure coded data.

4. The method of claim 1 wherein the query messages include a timestamp indicating a current time.

5. The method of claim 4 wherein the reply messages of the first quorum each indicate that the timestamp is later than a pending write timestamp.

6. The method of claim 4 wherein the reply messages of the first quorum each indicate that the timestamp is later than a validation timestamp for a previous version of the data block.

7. The method of claim 6 wherein the query reply message from the storage device upon which the data block is to be stored includes the validation timestamp and the previous version of the data block.

8. The method of claim 7 wherein each of the modify messages include the timestamp and the validation timestamp.

9. The method of claim 8 wherein the modify message sent to the storage device upon which the data block is to be stored includes the data block.

10. The method of claim 9 wherein the modify messages sent to the storage devices which hold parity blocks include the previous version of the data block and the data block.

11. The method of claim 10 wherein the write reply messages from the second quorum indicate that the validation timestamp equals a maximum timestamp for the stripe block stored on the storage device.

12. The method of claim 10 wherein the write reply messages from the second quorum indicate that the timestamp is no earlier than the pending write timestamp.

13. The method of claim 10 wherein the write reply message from the storage device which stores the data block indicates that the data block was stored successfully.

14. The method of claim 9 wherein the modify messages sent to the storage devices which hold parity blocks include a coded block which represents the previous version of the data block and the data block.

15. The method of claim 1 wherein the stripe of erasure coded data was previously stored using a technique of striping.

16. A method of writing data comprising the steps of:
   receiving a particular data block for storage within a stripe of erasure coded data, the stripe comprising stripe blocks which comprise a first number of data blocks and a second number of parity blocks;
   sending a query message including a timestamp indicating a current time to each of a plurality of storage devices upon which the stripe of erasure coded data is stored, the query message sent to a target storage device upon which the particular data block is to be stored including an identifier of the stripe of erasure coded data;

receiving a query reply message from each of at least a first quorum of the storage devices indicating that the timestamp is later than a pending write timestamp and that the timestamp is later than a validation timestamp for the earlier version of the stripe block, the query reply message from the target storage device including the validation timestamp and a previous version of the particular data block;

sending a modify message to each of the storage devices including the timestamp and the validation timestamp, the modify message sent to the storage device upon which the block of data is to be stored including the particular data block, the modify messages sent to the storage devices which hold the parity blocks including information used to update the parity blocks; and receiving a write reply message from each of at least a second quorum of the storage devices indicating that the validation timestamp equals a maximum timestamp for the stripe block stored on the storage device, and that the timestamp is no earlier than the pending write timestamp, the first and second quorums each meeting a quorum condition of a number such that any two selections of the number of the stripe blocks intersect in a minimum number of the stripe blocks needed to decode the stripe.

17. The method of claim 16 wherein the information used to update the parity blocks comprises a coded block which represents the previous version of the particular data block and the particular data block.

18. The method of claim 16 wherein the information used to update the parity blocks comprises the previous version of the particular data block and the particular data block.

19. A computer readable memory comprising computer code for implementing a method of writing data, the method of writing the data comprising the steps of:

receiving a data block for storage within a stripe of erasure coded data, the stripe comprising stripe blocks;

sending a query message to each of a plurality of storage devices upon which the stripe of erasure coded data is stored;

receiving a query reply message from each of at least a first quorum of the storage devices;

sending a modify message to each of the storage; and receiving a write reply message from each of at least a second quorum of the storage devices, the first and second quorums each meeting a quorum condition of a number such that any two selections of the number of the stripe blocks intersect in a minimum number of the stripe blocks needed to decode the stripe.

20. The computer readable memory of claim 19 wherein the stripe blocks comprise a first number of data blocks and a second number of parity blocks.

21. The computer readable memory of claim 19 wherein the query message sent to the storage device upon which the data block is to be stored includes an identifier of the stripe of erasure coded data.

22. The computer readable memory of claim 19 wherein the query messages include a timestamp indicating a current time.

23. The computer readable memory of claim 22 wherein the reply messages of the first quorum each indicate that the timestamp is later than a pending write timestamp.

24. The computer readable memory of claim 22 wherein the reply messages of the first quorum each indicate that the timestamp is later than a validation timestamp for a previous version of the data block.

25. The computer readable memory of claim 24 wherein the query reply message from the storage device upon which the data block is to be stored includes the validation timestamp and the previous version of the data block.

26. The computer readable memory of claim 25 wherein each of the modify messages include the timestamp and the validation timestamp.

27. The computer readable memory of claim 26 wherein the modify message sent to the storage device upon which the data block is to be stored includes the data block.

28. The computer readable memory of claim 27 wherein the modify messages sent to the storage devices which hold parity blocks include the previous version of the data block and the data block.

29. The computer readable memory of claim 28 wherein the write reply messages from the second quorum indicate that the validation timestamp equals a maximum timestamp for the stripe block stored on the storage device.

30. The computer readable memory of claim 28 wherein the write reply messages from the second quorum indicate that the timestamp is no earlier than the pending write timestamp.

31. The computer readable memory of claim 28 wherein the write reply message from the storage device which stores the data block indicates that the data block was stored successfully.

32. The computer readable memory of claim 27 wherein the modify messages sent to the storage devices which hold parity blocks include a coded block which represents the previous version of the data block and the data block.

33. The computer readable memory of claim 19 wherein the stripe of erasure coded data was previously stored using a technique of striping.

* * * * *